(12) United States Patent
Wang

(10) Patent No.: US 11,951,952 B2
(45) Date of Patent: Apr. 9, 2024

(54) BICYCLE CROSS BAR ADAPTOR WITH A CONTROL UNIT

(71) Applicant: KING RACK INDUSTRIAL CO., LTD., Taichung (TW)

(72) Inventor: Chiu Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 119 days.

(21) Appl. No.: 17/842,619

(22) Filed: Jun. 16, 2022

(65) Prior Publication Data

US 2023/0001859 A1   Jan. 5, 2023

(30) Foreign Application Priority Data

Jun. 30, 2021   (TW) ................................ 110207640

(51) Int. Cl.
*B60R 9/10* (2006.01)
*B62H 1/00* (2006.01)
*F16B 7/10* (2006.01)

(52) U.S. Cl.
CPC .................. *B60R 9/10* (2013.01); *B62H 1/00* (2013.01); *F16B 7/105* (2013.01)

(58) Field of Classification Search
CPC ... B60R 9/10; B60R 9/045; B60H 1/00; B62J 50/10; F16B 7/14; F16B 7/1454; F16B 7/105; E05B 71/00
See application file for complete search history.

(56) References Cited

U.S. PATENT DOCUMENTS

| | | | | |
|---|---|---|---|---|
| 529,861 A | * | 11/1894 | Hersh | B62K 13/00 280/7.11 |
| 2,817,522 A | * | 12/1957 | Margulies | A63B 17/00 482/145 |
| 4,029,279 A | * | 6/1977 | Nakatani | F16B 7/1454 403/109.5 |
| 4,585,246 A | * | 4/1986 | Diekman | B62K 19/30 280/281.1 |
| 4,586,399 A | * | 5/1986 | Kassai | B62B 7/08 403/108 |
| 4,761,092 A | * | 8/1988 | Nakatani | F16M 11/2021 403/109.5 |
| 5,149,112 A | * | 9/1992 | Nauman | B62J 1/167 280/7.11 |

(Continued)

*Primary Examiner* — Paul N Dickson
*Assistant Examiner* — Timothy Wilhelm
(74) *Attorney, Agent, or Firm* — Che-Yang Chen; Law Office of Michael Chen

(57) ABSTRACT

A bicycle retractable bicycle cross bar adaptor includes a bar having a first tube, a second tube and a control unit. The first tube has a first connection end and the second tube has a second connection end which is movably inserted into the first connection end. The second tube includes multiple holes. The control unit includes an inner part, a switch and a sleeve. A switch is pivotably connected to the inner part and the sleeve is mounted to the inner part and the switch. The sleeve includes a flexible tongue to pivot the switch. The switch includes a rod on one end thereof. When the switch is pivoted, the rod is inserted into one of the holes of the second tube to set the length of the bar. When the rod is removed from the hole, the second tube is moved relative to the first tube.

8 Claims, 6 Drawing Sheets

(56) References Cited

U.S. PATENT DOCUMENTS

| | | | | |
|---|---|---|---|---|
| 5,558,349 A * | 9/1996 | Rubin | ............... | B62H 5/00 |
| | | | | 280/287 |
| 5,595,410 A * | 1/1997 | Wilson | ............... | F16B 2/246 |
| | | | | 292/259 R |
| 5,713,555 A * | 2/1998 | Zurfluh | ............... | B62K 19/36 |
| | | | | 248/599 |
| 5,775,352 A * | 7/1998 | Obitts | ............... | A45B 9/00 |
| | | | | 135/65 |
| 5,791,805 A * | 8/1998 | Lynch | ............... | F16B 7/1454 |
| | | | | 403/374.1 |
| 6,338,587 B1 * | 1/2002 | Kuo | ............... | F16B 7/105 |
| | | | | 190/115 |
| 6,347,777 B1 * | 2/2002 | Webber | ............... | A47C 7/402 |
| | | | | 248/188.5 |
| 6,409,412 B1 * | 6/2002 | Huang | ............... | F16B 2/246 |
| | | | | 248/188.5 |
| 6,471,232 B2 * | 10/2002 | Huang | ............... | B62H 5/04 |
| | | | | 280/304.5 |
| 6,513,191 B1 * | 2/2003 | Kim | ............... | A47L 9/244 |
| | | | | 285/7 |
| 6,634,674 B1 * | 10/2003 | Xu | ............... | A47L 9/244 |
| | | | | 285/302 |
| 6,854,916 B2 * | 2/2005 | Hsieh | ............... | F16B 7/105 |
| | | | | 403/109.1 |
| 7,144,180 B2 * | 12/2006 | Stahle | ............... | F16B 7/10 |
| | | | | 403/374.1 |
| 7,222,892 B2 * | 5/2007 | Guidetti | ............... | F16B 2/246 |
| | | | | 292/306 |
| 7,494,161 B2 * | 2/2009 | Kanai | ............... | F16L 25/10 |
| | | | | 285/317 |
| 7,516,988 B2 * | 4/2009 | Lin | ............... | A47L 9/244 |
| | | | | 285/302 |
| 7,959,191 B2 * | 6/2011 | Schouten | ............... | A47L 13/23 |
| | | | | 285/298 |
| 8,038,173 B2 * | 10/2011 | Canale | ............... | A47L 9/244 |
| | | | | 285/303 |
| 8,128,306 B2 * | 3/2012 | Gorza | ............... | B62J 1/08 |
| | | | | 403/109.5 |
| 8,336,835 B1 * | 12/2012 | Benner | ............... | E04F 21/1805 |
| | | | | 248/200.1 |
| 8,376,646 B2 * | 2/2013 | Melino, Sr. | ............... | F16B 7/1454 |
| | | | | 403/322.4 |
| 8,388,254 B2 * | 3/2013 | Huang | ............... | F16B 7/105 |
| | | | | 403/109.1 |
| 8,485,488 B2 * | 7/2013 | Forrest | ............... | A47C 3/20 |
| | | | | 248/407 |
| 8,684,620 B2 * | 4/2014 | Lin | ............... | B25G 1/04 |
| | | | | 81/177.2 |
| 9,045,914 B2 * | 6/2015 | Van Der Meijden | ............... | F16B 7/1454 |
| 9,168,968 B2 * | 10/2015 | Pomerantz | ............... | B62K 19/30 |
| 9,347,472 B2 * | 5/2016 | Lambertson, Jr. | ............... | B25G 1/102 |
| 9,648,805 B2 * | 5/2017 | Nie | ............... | F16B 7/1418 |
| D798,771 S * | 10/2017 | Pomerantz | ............... | D12/114 |
| 9,889,897 B2 * | 2/2018 | Cabello Soro | ............... | B62K 3/04 |
| 9,895,040 B2 * | 2/2018 | Canale | ............... | A47L 9/244 |
| 10,328,984 B2 * | 6/2019 | Wang | ............... | B62K 3/04 |
| 10,722,034 B2 * | 7/2020 | Winterhalter | ............... | A47C 4/48 |
| 10,774,552 B2 * | 9/2020 | Klein | ............... | E04F 21/1833 |
| 10,883,526 B2 * | 1/2021 | Chen | ............... | F16B 7/14 |
| 11,174,678 B2 * | 11/2021 | Kieffer | ............... | E06C 7/08 |
| 11,441,589 B1 * | 9/2022 | Ravnaas | ............... | F16B 7/1454 |
| 11,453,344 B2 * | 9/2022 | Liu | ............... | F16B 45/023 |
| 11,478,085 B2 * | 10/2022 | Sollie | ............... | F16B 7/1454 |
| 11,535,288 B2 * | 12/2022 | Leblanc | ............... | A47B 96/14 |
| 2003/0213330 A1 | 11/2003 | Wang | ............... | F16B 7/1427 |
| | | | | 74/543 |
| 2021/0046881 A1 * | 2/2021 | Vidar | ............... | B60R 9/058 |
| 2022/0332384 A1 * | 10/2022 | Munro | ............... | B62J 1/167 |
| 2022/0362922 A1 * | 11/2022 | Tata | ............... | B25G 1/04 |

* cited by examiner

BICYCLE CROSS BAR ADAPTOR WITH A CONTROL UNIT

BACKGROUND OF THE INVENTION

1. Fields of the Invention

The present invention relates to a bicycle cross bar adaptor, and more particularly, to a retractable bicycle cross bar adaptor having a control unit that includes a press type switch.

2. Descriptions of Related Art

The bicycle cross bar adaptor is used to be installed between the seat tube and the head tube of a bicycle so that when the bicycle is carried by a bicycle rack on a vehicle, the bicycle rack supports or clamps the cross bar adaptor.

Taiwanese Utility Model No. M559826 discloses a retractable bicycle cross bar adaptor that includes a bar, a movable unit and a securing unit. The bar has multiple notches, and the movable unit is slidably connected to the bar. The movable unit includes a base, a slide and a stop, wherein the slide is slidably connected to the base so as to be in contact with the stop optionally. The stop is engaged one of the notches of the bar. The securing unit is connected to the movable unit and is connected to a bicycle.

Although the length of the retractable bicycle cross bar adaptor can be adjusted, it involves too many pars and the parts have complicated shapes. The slide is biased by two springs which moves the slide back and forth when the user pushes the base to allow the stop to move, such that the bar can be extended or retracted to adjust the length of the cross bar adaptor. It is noted that the movable unit and the securing unit includes many parts that have different sizes and shapes, some of the parts are tiny, therefore the manufacturing cost of the retractable bicycle cross bar adaptor is high and cannot compete with other similar products in the market.

The present invention intends to provide a retractable bicycle cross bar adaptor to eliminate the shortcomings mentioned above.

SUMMARY OF THE INVENTION

The present invention relates to a retractable bicycle cross bar adaptor and comprises a bar having a first tube, a second tube and a control unit. The first tube has a first end and a second end, and the second tube has a first end and a second end. The control unit is connected between the first tube and the second tube. A first hook is connected to the second end of the first tube, and a second hook is connected to the second end of the second tube. The first tube has a non-circular cross section. A first connection end formed to the first end of the first tube. The second tube has a non-circular cross section that is matched with the non-circular cross section of the first tube. A second connection end is formed to the first end of the second tube. Multiple holes are defined through the wall of the second tube.

The control unit includes an inner part, a switch and a sleeve. The inner part is an oval-shaped tube and has a C-shaped cross section. The inner part includes a passage defined axially therethrough. The first connection end of the first tube is inserted into the passage from the first end of the inner part. The second connection end of the second tube is inserted into the passage from the second end of the inner part and slidably inserted into the first connection end. A slot is defined axially through the wall of the inner part and communicates with the first end and the second end of the inner part to form the C-shaped cross section. A support portion is formed between two inside walls of the slot.

The switch is pivotably connected to the inner part. The switch includes a first end and a second end. A first contact portion is formed to the top face of the first end of the switch. A rod is connected to the underside of the second end of the switch. The rod is removably inserted into one of the holes of the second tube. A portion of the underside of the second end of the switch is supported on the support portion when the rod is removably inserted into one of the holes of the second tube.

The sleeve includes a tunnel defined axially therethrough. The inner part is inserted into the tunnel of the sleeve. A tongue is formed to the wall of the sleeve and located corresponding to the slot. The tongue includes a second contact portion formed to the inside thereof. The second contact portion is removably engaged with the first contact portion. When the tongue is pressed toward the slot, the switch is pivoted to remove the rod from the hole so that the second tube is movable relative to the first tube.

Preferably, the first tube includes a ridge extending inward from an inner periphery thereof. The second tube includes a groove defined axially in the outer periphery thereof. The multiple holes are defined through the inner bottom of the groove. The ridge is located corresponding to the groove.

Preferably, an end cap is connected to the second connection end of the second tube.

Preferably, the switch includes a pivotal portion formed between the first end and the second end of the switch. A bore is defined through the two inside walls of the slot. A pin extends through the bores, the pivotal portion and a resilient member to pivotably connect the switch in the slot. The resilient member is a torsion spring and two ends of the resilient member are respectively biased between the switch and the inner part. The first end of the switch is parallel to the second end of the switch. The first end of the switch is higher than the second end of the switch when the rod is inserted into one of the holes of the second tube.

Preferably, the first contact portion includes multiple parallel first ribs protruding therefrom. The second contact portion includes multiple parallel second ribs protruding therefrom. The first contact portion is removably engaged with the second contact portion.

Preferably, a flange extends radially and inward from the inner periphery of the second end of the inner part. The inner diameter of the flange is smaller than that of the passage. The first connection end of the first tube contacts the flange.

Preferably, a lip extends radially and inward from one of two ends thereof. The first end of the inner part contacts the lip when the inner part is inserted into the tunnel of the sleeve.

Preferably, the sleeve includes a U-shaped slit defined through the wall thereof so as to form the tongue along the U-shaped slit.

The operation of the control unit of the present invention is easy by simply pressing the tongue to pivot the switch. When the rod on the switch is removed from the hole of the second tube, the second tube is movable relative to the first tube to adjust the length of the cross bar adaptor. When the rod is inserted into one of the holes of the second tube, the second tube cannot move relative to the first tube so as to set the desired length of the cross bar adaptor.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
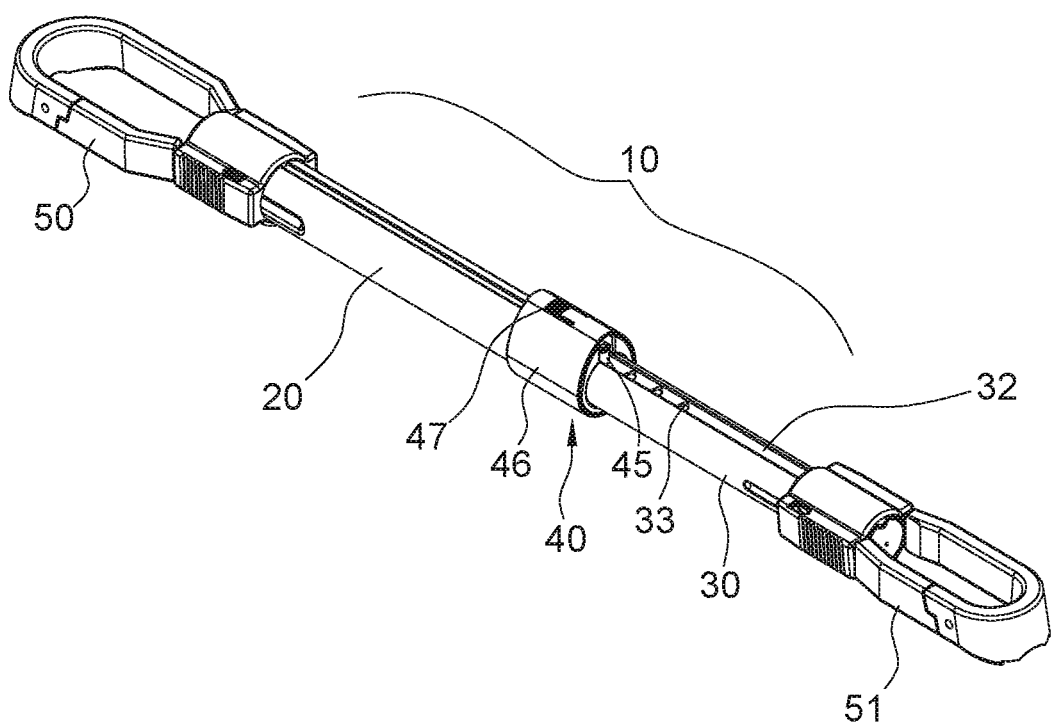
FIG. 1 is a perspective view to show the retractable cross bar adaptor of the present invention.
Figure 2:
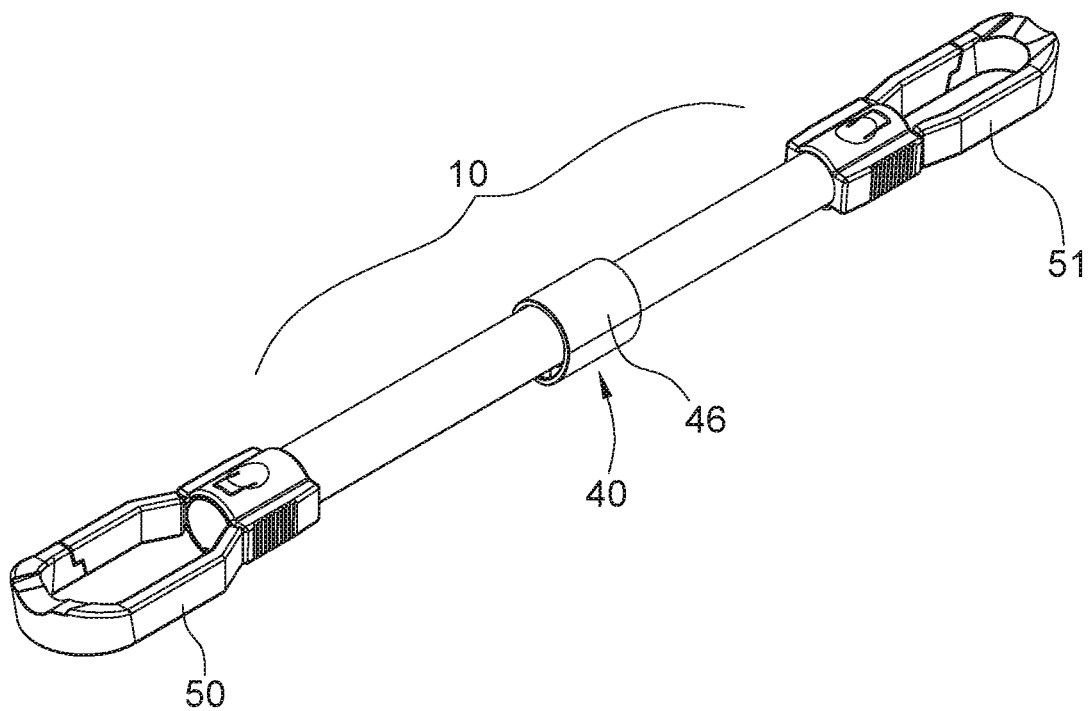
FIG. 2 is another perspective view to show the retractable cross bar adaptor of the present invention.
Figure 3:
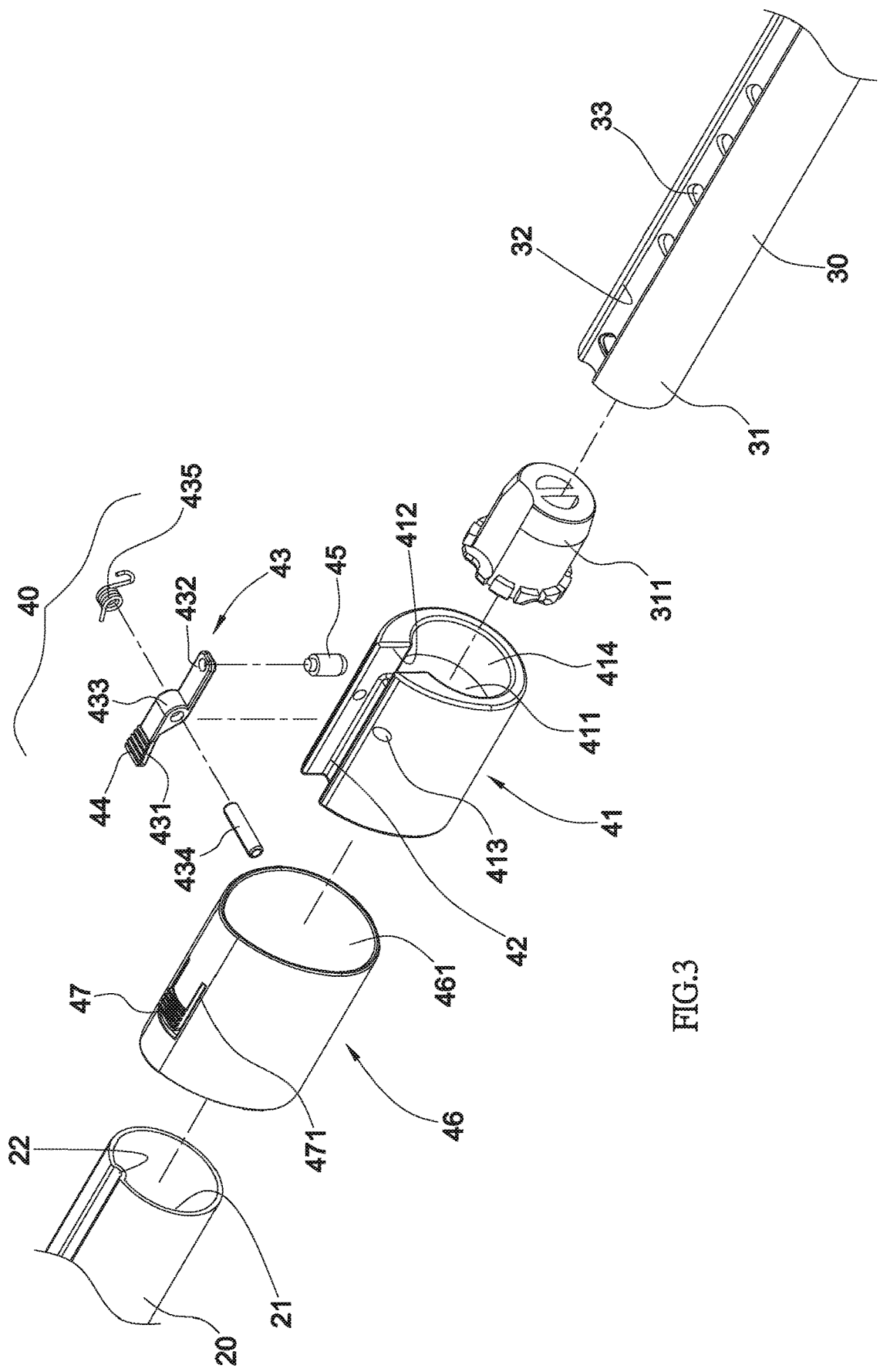
FIG. 3 is an exploded view of the retractable cross bar adaptor of the present invention.

Referring to FIGS. 1 to 3, the retractable cross bar adaptor of the present invention comprises a bar 10 having a first tube 20, a second tube 30 and a control unit 40. The first tube 20 has a first end and a second end, and the second tube 30 has a first end and a second end. The control unit 40 is located between the first tube 20 and the second tube 30. A first connection end 21 is formed to the first end of the first tube 20, and a second connection end 31 formed to the first end of the second tube 30. The second connection end 31 is slidably inserted into the first connection end 21. An end cap 311 is connected to the second connection end 31 of the second tube 30 so as to prevent dust from entering the second tube 30 and to reinforce the structure strength. The first tube 20 includes a ridge 22 extending inward from the inner periphery thereof. The second tube 30 includes a groove 32 defined axially in the outer periphery thereof. Multiple holes 33 are defined through the inner bottom of the groove 32. The ridge 22 is located corresponding to the groove 32.

Figure 8:
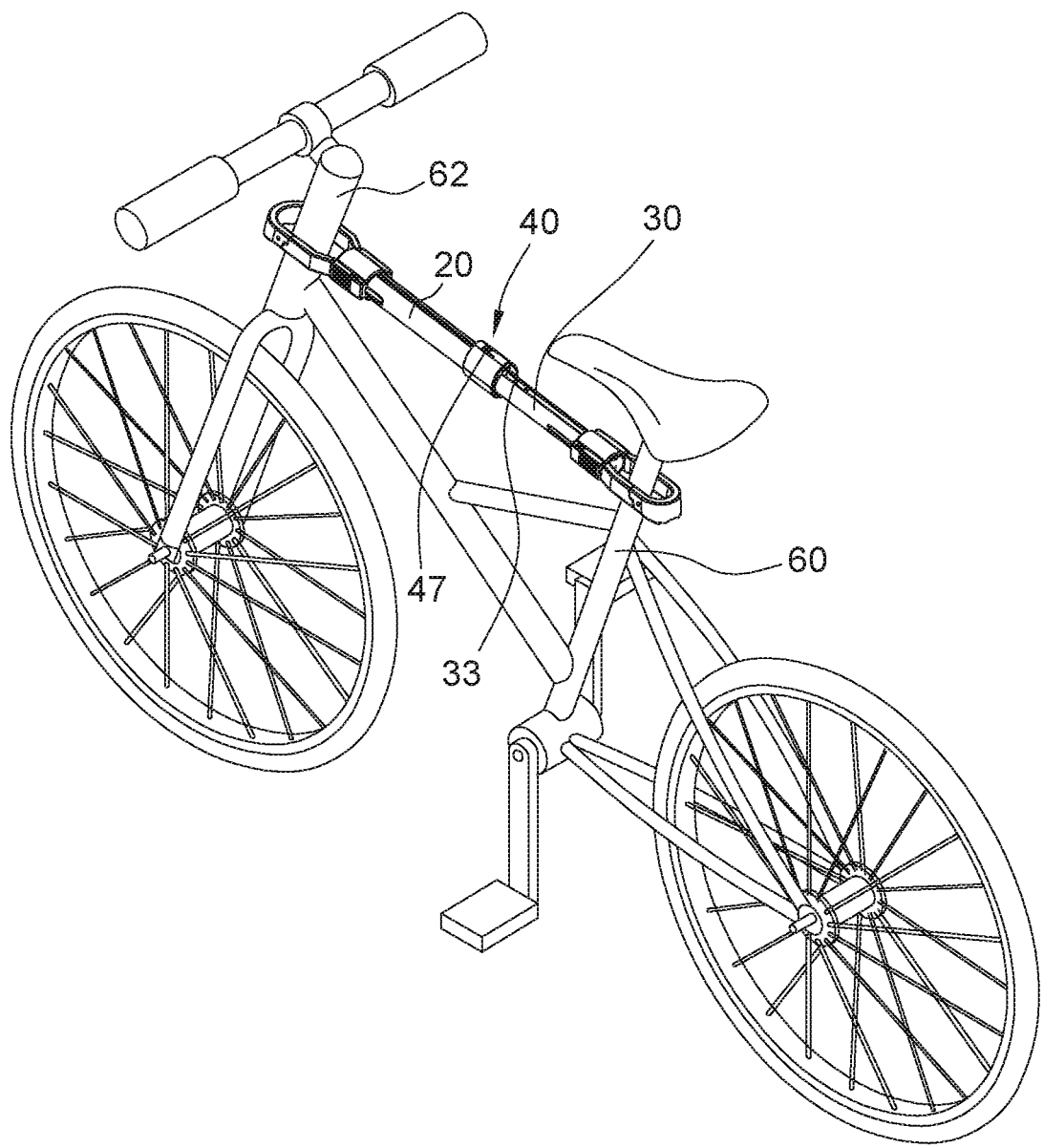
FIG. 8 shows that the retractable cross bar adaptor of the present invention is used to a bicycle.

A first hook 50 is connected to the second end of the first tube 20, and a second hook 51 connected to the second end of the second tube 30. As shown in FIG. 8, the first and second hooks 50, 51 are respectively hooked to the head tube 62 and the seat tube 60 of a bicycle to perform as a top tube of the bicycle.

The control unit 40 includes an inner part 41, a switch 43 and a sleeve 46. The inner part 41 is an oval-shaped tube and has a C-shaped cross section. The inner part 41 includes a passage 411 defined axially therethrough. The first connection end 21 of the first tube 20 is inserted into the passage 411 from the first end of the inner part 41. The second connection end 31 of the second tube 30 is inserted into the passage 411 from the second end of the inner part 41 and slidably inserted into the first connection end 21. A slot 412 is defined axially through the wall of the inner part 41 and communicates with the first end and the second end of the inner part 41 to form the C-shaped cross section. A support portion 42 is formed between two inside walls of the slot 412.

Figure 4:
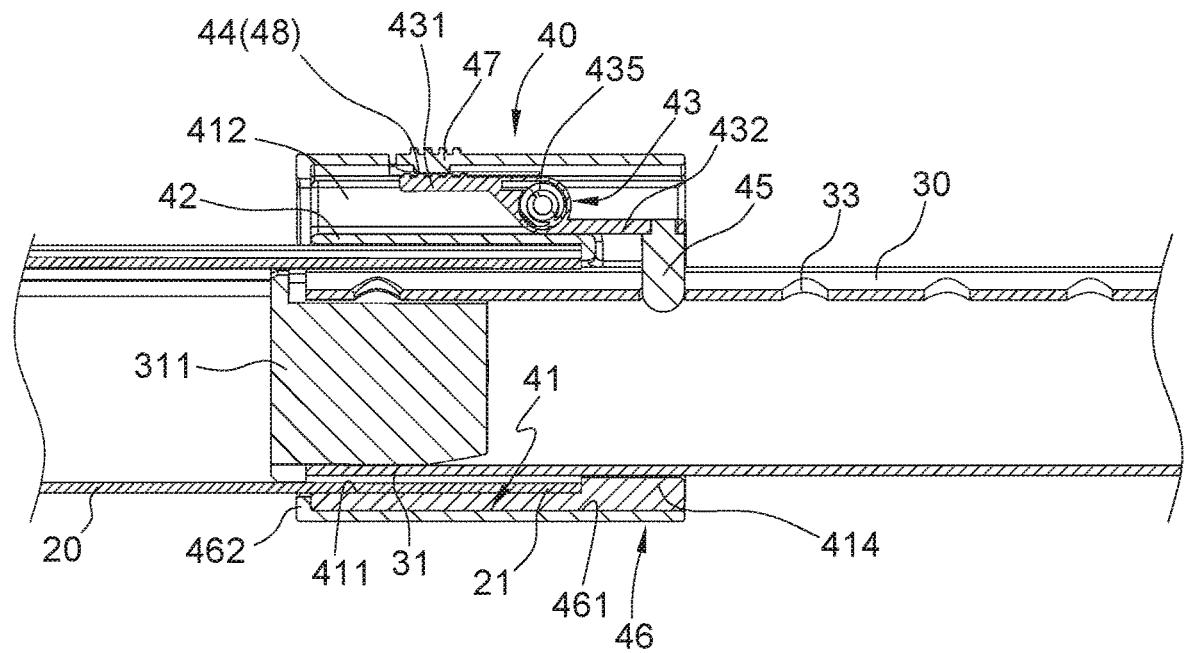
FIG. 4 is a cross sectional view to show that the switch is pivoted, and the rod on the switch is inserted into one of the holes of the second tube.
Figure 6:
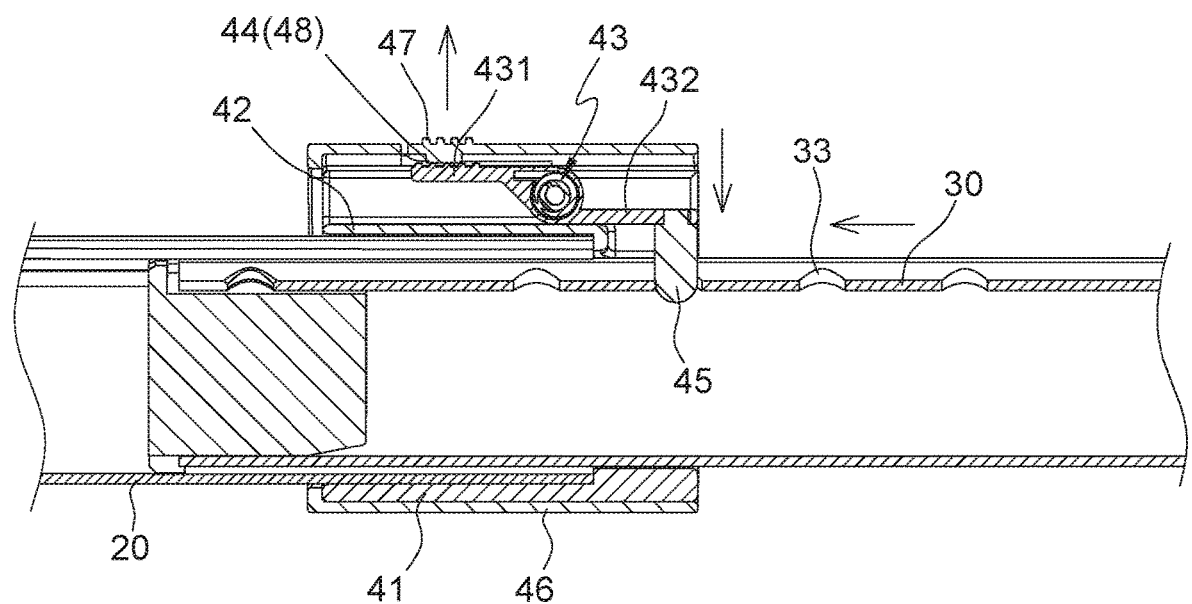
FIG. 6 is a cross sectional view to show that that the rod on the switch is inserted into another one of the holes of the second tube.
Figure 7:
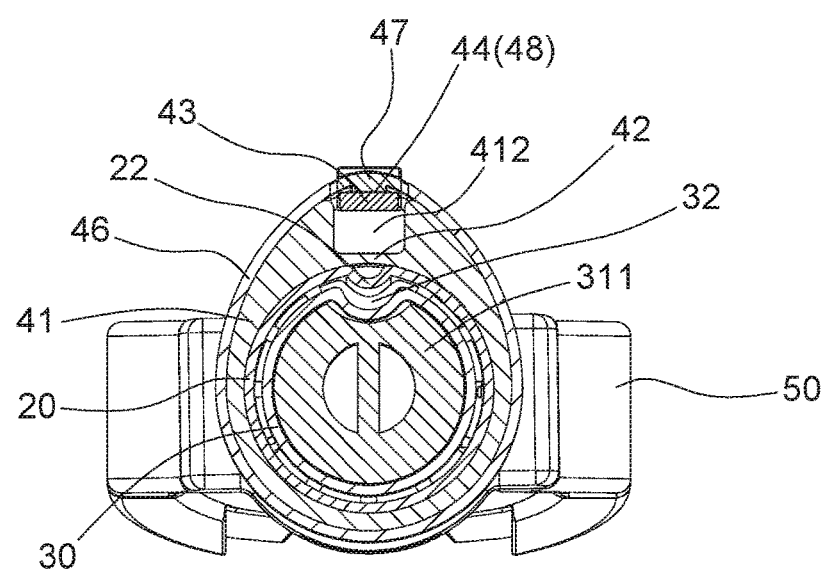
FIG. 7 is an end cross sectional view of the retractable cross bar adaptor of the present invention.

The switch 43 is pivotably connected to the inner part 41. Specifically, the switch 43 including a first end 431, a pivotal portion 433 and a second end 432. The pivotal portion 433 is formed between the first end 431 and the second end 432 of the switch 43. A first contact portion 44 is formed to the top face of the first end 431 of the switch 43. A rod 45 is connected to the underside of the second end 432 of the switch 43. A bore 413 is defined through the two inside walls of the slot 412. A pin 434 extends through the bores 413, the pivotal portion 433 and a resilient member 435 to pivotably connect the switch 43 in the slot 412. The resilient member 435 is a torsion spring, and two ends of the resilient member 435 are respectively biased between the switch 43 and the inner part 41 so as to provide a force to recover the initial status of the switch 43 as shown in FIG. 4. The rod 45 is removably inserted into one of the holes 33 of the second tube 30. A portion of the underside of the second end 432 of the switch 43 is supported on the support portion 42 when the rod 45 is removably inserted into one of the holes 33 of the second tube 30 as shown in FIGS. 4, 6 and 7. The first end 431 of the switch 43 is parallel to the second end 432 of the switch 43. The first end 431 of the switch 43 is higher than the second end 432 of the switch 43 when the rod 45 is inserted into one of the holes 33 of the second tube 30 as shown in FIG. 4.

The sleeve 46 includes a tunnel 461 defined axially therethrough. The inner part 41 and the switch member 43 are inserted into the tunnel 461 of the sleeve 46. A tongue 47 is formed to a wall of the sleeve 46 and located corresponding to the slot 412. Specifically, the sleeve 46 includes a U-shaped slit 471 defined through the wall thereof so as to form the tongue 47 along the U-shaped slit 471. The tongue 47 is flexible and includes a second contact portion 48 formed to the underside of its distal end thereof. The second contact portion 48 is removably engaged with the first contact portion 44.

In this embodiment, the first contact portion 44 includes multiple parallel first ribs/teeth protruding therefrom, and the second contact portion 48 includes multiple parallel second ribs/teeth protruding therefrom. Therefore, the first contact portion 44 is able to be removably engaged with the second contact portion 48 to maintain the switch 43 at its initial status.

As shown in FIG. 4, a flange 414 extends radially and inward from the inner periphery of the second end of the inner part 41. The inner diameter of the flange 414 is smaller than that of the passage 411, so that the first connection end 21 of the first tube 20 contacts the flange 414. In addition, a lip 462 extends radially and inward from one of two ends thereof. The first end of the inner part 41 contacts the lip 46 when the inner part 41 is inserted into the tunnel 461 of the sleeve 46.

Figure 5:
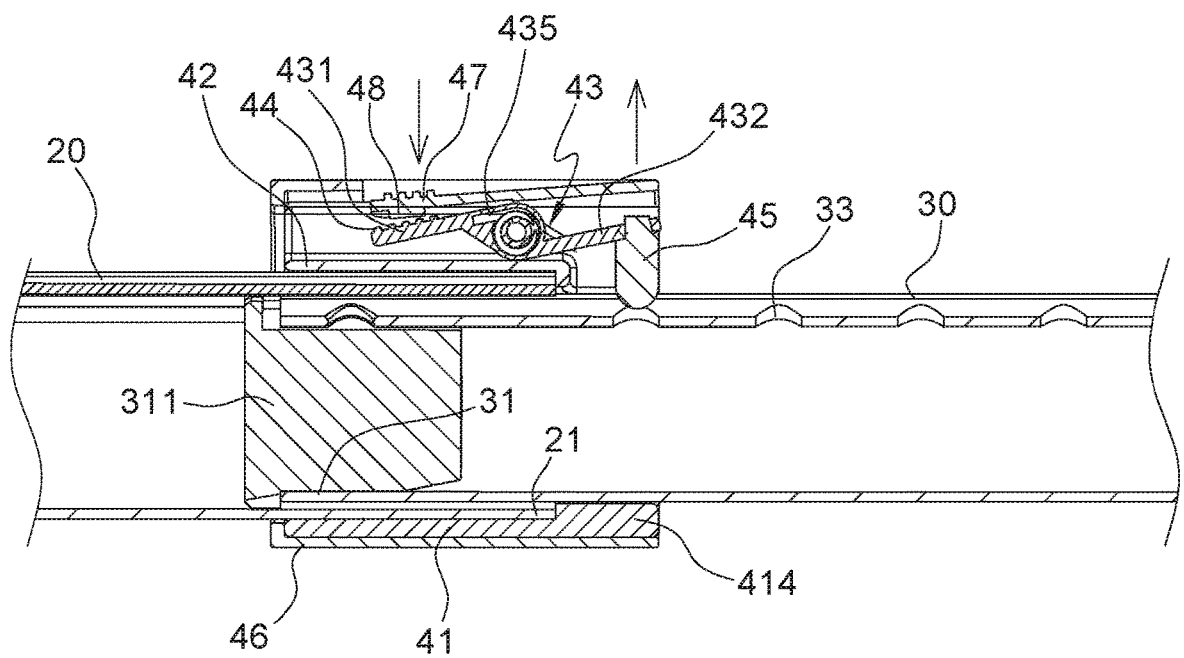
FIG. 5 is a cross sectional view to show that that the switch is pivoted, the rod on the switch is removed from the hole of the second tube.

When in use, the first and second hooks 50, 51 are respectively hooked to the head tube 62 and the seat tube 60 of a bicycle to perform as a top tube of the bicycle as shown in FIG. 8. By pressing the tongue 47 downward toward the slot 412 as shown in FIG. 5, the switch 43 is pivoted, and the first end 431 of the switch 43 is moved toward the support portion 42, and the second end 432 of the switch 43 is moved upward so that the rod 45 is removed from the hole 33 of the second tube 30. Therefore, the second tube 30 is movable relative to the first tube 20 to adjust the length of the bar 10. As shown in FIG. 6, the rod 45 is inserted into another hole 33 of the second tube 30 to set the desired length of the bar 10 by releasing the tongue 47. The resilient spring 435 returns the switch 43 to its initial position, and the first and second contact portions 44 48 are engaged with each other again.

While we have shown and described the embodiment in accordance with the present invention, it should be clear to those skilled in the art that further embodiments may be made without departing from the scope of the present invention.

What is claimed is:

1. A retractable bicycle cross bar adaptor, comprising:
a bar having a first tube, a second tube and a control unit, the first tube having a first end and a second end, the second tube having a first end and a second end, the control unit connected between the first tube and the second tube, a first hook connected to the second end of the first tube, a second hook connected to the second end of the second tube;
the first tube having a non-circular cross section, a first connection end formed to the first end of the first tube, the second tube having a non-circular cross section that is matched with the non-circular cross section of the first tube, a second connection end formed to the first end of the second tube, multiple holes defined through a wall of the second tube;
the control unit including an inner part, a switch and a sleeve, the inner part being an oval-shaped tube and having a C-shaped cross section, the inner part including a passage defined axially therethrough, the first connection end of the first tube inserted into the passage from a first end of the inner part, the second connection end of the second tube inserted into the passage from a second end of the inner part and slidably inserted into the first connection end, a slot defined axially through a wall of the inner part and communicating with the first end and the second end of the inner part to form the C-shaped cross section, a support portion formed between two inside walls of the slot;
the switch pivotably connected to the inner part, the switch including a first end and a second end, a first contact portion formed to a top face of the first end of the switch, a rod connected to an underside of the second end of the switch, the rod removably inserted into one of the holes of the second tube, a portion of the underside of the second end of the switch being supported on the support portion when the rod is removably inserted into one of the holes of the second tube, and
the sleeve including a tunnel defined axially therethrough, the inner part inserted into the tunnel of the sleeve, a tongue formed to a wall of the sleeve and located corresponding to the slot, the tongue including a second contact portion formed to an inside thereof, the second contact portion removably engaged with the first contact portion, when the tongue is pressed toward the slot, the switch is pivoted to remove the rod from the hole so that the second tube is movable relative to the first tube.

2. The retractable bicycle cross bar adaptor as claimed in claim 1, wherein the first tube includes a ridge extending inward from an inner periphery thereof, the second tube includes a groove defined axially in an outer periphery thereof, the multiple holes are defined through an inner bottom of the groove, the ridge is located corresponding to the groove.

3. The retractable bicycle cross bar adaptor as claimed in claim 1, wherein an end cap is connected to the second connection end of the second tube.

4. The retractable bicycle cross bar adaptor as claimed in claim 1, wherein the switch includes a pivotal portion formed between the first end and the second end of the switch, a bore is defined through the two inside walls of the slot, a pin extends through the bores, the pivotal portion and a resilient member to pivotably connect the switch in the slot, the resilient member is a torsion spring and two ends of the resilient member respectively biased between the switch and the inner part, the first end of the switch is parallel to the second end of the switch, the first end of the switch is higher than the second end of the switch when the rod is inserted into one of the holes of the second tube.

5. The retractable bicycle cross bar adaptor as claimed in claim 1, wherein the first contact portion includes multiple parallel first ribs protruding therefrom, the second contact portion includes multiple parallel second ribs protruding therefrom, the first contact portion is removably engaged with the second contact portion.

6. The retractable bicycle cross bar adaptor as claimed in claim 1, wherein a flange extends radially and inward from an inner periphery of the second end of the inner part, an inner diameter of the flange is smaller than that of the passage, the first connection end of the first tube contacts the flange.

7. The retractable bicycle cross bar adaptor as claimed in claim 1, wherein a lip extends radially and inward from one of two ends thereof, the first end of the inner part contacts the lip when the inner part is inserted into the tunnel of the sleeve.

8. The retractable bicycle cross bar adaptor as claimed in claim 1, wherein the sleeve includes a U-shaped slit defined through the wall thereof so as to form the tongue along the U-shaped slit.

* * * * *